Patented Aug. 15, 1950

2,518,922

UNITED STATES PATENT OFFICE 2,518,922

SALICYLIC ACID DERIVATIVES AND METHOD FOR MAKING SAME

David T. Mowry, Dayton, Ohio, assignor to Monsanto Chemical Company, St. Louis, Mo., a corporation of Delaware No Drawing. Application June 19, 1946, Serial No. 677,912

6 Claims. (Cl. 260—338)

1

This invention relates to the preparation of new compounds having the formula:

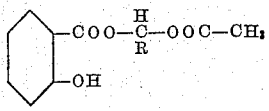

where R is selected from the group consisting of H and $CH_3$. The two new compounds may be designated as acetoxy methylsalicylate and alpha-acetoxyethylsalicylate.

The present compounds are useful as pharmaceuticals, insecticides or as ingredients thereof and as intermediates for chemical syntheses. By treatment of the above compounds by heat, preferably in the presence of an acid substance, they may be converted in good yields respectively into 4-keto-1,3-benzodioxane and 2-methyl-4-keto-1,3-benzodioxane.

The compounds provided by this invention may be prepared by mixing together in equal molecular proportions sodium salicylate and either chloromethyl acetate or alpha-chloroethyl acetate. The mixture is refluxed until the reaction is substantially completed, washed several times with water, extracted with ether and then distilled. If desired, a solvent may be employed in carrying out the reaction.

A detailed procedure for preparing these two compounds in good yields is given in the following examples:

Example 1

Acetoxymethyl salicylate.—Chloromethyl acetate, B. P. 112–144°, was prepared in 62% yield by the method of Ulich and Adams (J. Am. Chem. Soc. 42, 660–7 (1921)). Two mols (218 g.) of this material and 320 g. (2 mols) of sodium salicylate were refluxed in 400 cc. of methyl ethyl ketone containing 2 g. of potassium iodide for 40 hours. The product was poured into several volumes of water, extracted with ether, washed with successive portions of dilute sodium carbonate and hydrochloric acid solutions and distilled to give 264 g. (64%) of acetoxymethyl salicylate, B. P. 106–7° (1.0 mm.), $n_D^{25}$ 1.5212. A similar run of 30 hours' duration gave a 59% yield. The product gave a strong violet color in ferric chloride solution.

Anal. calcd. for $C_{10}H_{10}O_5$: C, 57.2; H, 4.80. Found: C, 56.99; H, 4.82.

Example 2

Alpha-acetoxyethyl salicylate.—Alpha-chloroethyl acetate, B. P. 112–116°, was prepared by the method of Ulich and Adams (J. Am. Chem. Soc. 43, 660–7 (1921)) in 65% yield. One mol (122.5 g.) of this material was refluxed for 50 hours with 160 g. (1.0 mol) of sodium salicylate and 2 g. potassium iodide in 400 cc. of methyl ethyl ketone. The product was poured into several volumes of water and extracted with ether. The ether extract was washed with dilute sodium carbonate, water and dilute hydrochloric acid, and distilled rapidly to give 122 g. of crude product, B. P. 120–130° (2–3 mm.). Careful refractionation at high reflux ratio through a 50 cm. Vigreux column gave 74 g., 33% of purer material, B. P. 106–107° (1.0 mm.) $n_D^{25}$ 1.5072, which gave a typical violet color with ferric chloride solution.

Anal. calcd. for $C_{11}H_{12}O_5$: C, 58.9; H, 5.39. Found: C, 58.79; H, 5.35.

The above compounds may be converted by ring closure to 1,3-benzodioxane derivatives. This reaction is illustrated by the following examples:

Example 3

4-keto-1,3-benzodioxane.—Acetoxymethyl salicylate (213 g., 1.03 mols) and 0.4 cc. sulfuric acid were heated in a bath at 115–120° under a short column at 30 mm. pressure. After three hours the theoretical amount of acetic acid had been distilled out and the product was then distilled rapidly at 100–105° at 1.5 mm. Refractionation of the crude material gave 120 g., B. P. 99–103° (1.0 mm.), which was partially solid. Recrystallization from dilute ethanol gave 42 g. (28%) of pure material, M. P. 53°.

Example 4

Alpha-acetoxyethyl salicylate (52 g., 0.25 mol) and 0.2 cc. of concentrated sulfuric acid were heated in a water bath held at 80°, while acetic acid was removed as formed by distillation at 30 mm. through a Vigreux column. In three hours the material had lost 13.5 g. in weight (theory for 0.25 mol acetic acid, 15 g.). Distillation gave 33 g. of 2-methyl-4-keto-1,3-benzodioxane, B. P. 108° C. (3.0 mm.) which solidified at room temperature when seeded. The melting point was 32.5–33.0°.

Any acid may be used as a catalyst in the ring closure reaction. The amount of acid used is not critical, usually an amount just sufficient to maintain the pH of the reaction mixture on the acid side of neutrality will suffice.

The compound 2-methyl-4-ketone-1,3-benzodioxane is claimed in my copending application Serial No. 677,910, filed June 19, 1946, which in turn is a continuation-in-part of my earlier filed application Serial No. 595,067, filed May 27, 1945. The latter case has now become abandoned.

What I claim is:

1. The compound having the formula:

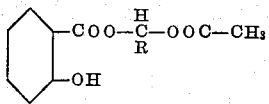

where R is selected from the group consisting of H and $CH_3$.

2. Acetoxymethyl salicylate.

3. Alpha-acetoxyethyl salicylate.

4. The process of effecting ring closure and formation of a 4-keto-1,3-benzodioxane in a compound having the formula:

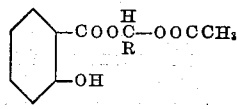

where R is selected from the group consisting of H and $CH_3$ which comprises heating the said compound in the presence of an acid substance.

5. The process of effecting ring closure and formation of 4-keto-1,3-benzodioxane which comprises heating acetoxymethyl salicylate in the presence of an acid substance.

6. The process of effecting ring closure and formation of 2-methyl-4-keto-1,3-benzodioxane which comprises heating α-acetoxyethyl salicylate in the presence of an acid substance.

DAVID T. MOWRY.

REFERENCES CITED

The following references are of record in the file of this patent:

UNITED STATES PATENTS

| Number | Name | Date |
|---|---|---|
| 2,069,175 | Preiswerk | Jan. 26, 1937 |
| 2,169,012 | West et al. | Aug. 8, 1939 |
| 2,409,134 | Lecher et al. | Oct. 8, 1946 |